United States Patent
Kuwata et al.

(10) Patent No.: US 10,361,445 B2
(45) Date of Patent: *Jul. 23, 2019

(54) MICROPOROUS LAYER SHEET FOR FUEL CELL AND METHOD FOR PRODUCING THE SAME

(75) Inventors: Shigemasa Kuwata, Yokohama (JP); Yozo Okuyama, Yokosuka (JP); Kazufumi Kodama, Zushi (JP)

(73) Assignee: NISSAN MOTOR CO., LTD., Tokohama-shi (JP)

( * ) Notice: Subject to any disclaimer, the term of this patent is extended or adjusted under 35 U.S.C. 154(b) by 777 days.

This patent is subject to a terminal disclaimer.

(21) Appl. No.: 14/125,426

(22) PCT Filed: May 31, 2012

(86) PCT No.: PCT/JP2012/064124
§ 371 (c)(1),
(2), (4) Date: Dec. 11, 2013

(87) PCT Pub. No.: WO2012/172989
PCT Pub. Date: Dec. 20, 2012

(65) Prior Publication Data
US 2014/0127606 A1    May 8, 2014

(30) Foreign Application Priority Data

Jun. 17, 2011  (JP) .................................. 2011-135078
Apr. 19, 2012  (JP) .................................. 2012-095527

(51) Int. Cl.
*H01M 8/10*    (2016.01)
*H01M 8/1004*    (2016.01)
(Continued)

(52) U.S. Cl.
CPC ....... *H01M 8/1004* (2013.01); *H01M 4/8605* (2013.01); *H01M 4/8642* (2013.01);
(Continued)

(58) Field of Classification Search
CPC ............ H01M 4/8636; H01M 8/0234; H01M 8/0241–8/0245; H01M 8/1004;
(Continued)

(56) References Cited

U.S. PATENT DOCUMENTS 7,326,488 B2    2/2008  Hayashi et al.
7,749,639 B2    7/2010  Ichikawa et al.
(Continued)

FOREIGN PATENT DOCUMENTS

CA    2767154 A1    12/2005
CN    101662032 A    3/2010
(Continued)

OTHER PUBLICATIONS

Carbon Black—Vulcan XC 72 R (spec sheet) obtained from http://fuelcellstore.com/vulcan-xc-72r on Aug. 3, 2016.*
(Continued)

*Primary Examiner* — Philip A. Stuckey
(74) *Attorney, Agent, or Firm* — Foley & Lardner LLP

(57) ABSTRACT

A microporous layer sheet for a fuel cell according to the present invention includes at least two microporous layers, which are stacked on a gas diffusion layer substrate, and contain a carbon material and a binder. Then, the microporous layer sheet for a fuel cell is characterized in that a content of the binder in the microporous layer as a first layer located on the gas diffusion layer substrate side is smaller than contents of the binder in the microporous layers other than the first layer. The microporous layer sheet for a fuel cell, which is as described above, can ensure gas permeability and drainage performance without lowering strength. Hence, the microporous layer sheet for a fuel cell, which is as described above, can contribute to performance enhancement of a polymer electrolyte fuel cell by application thereof to a gas diffusion layer.

5 Claims, 14 Drawing Sheets

(51) Int. Cl.
*H01M 8/0234* (2016.01)
*H01M 4/86* (2006.01)
*H01M 8/0245* (2016.01)
*H01M 8/1007* (2016.01)
*H01M 4/92* (2006.01)

(52) U.S. Cl.
CPC ....... *H01M 8/0234* (2013.01); *H01M 8/0245* (2013.01); *H01M 8/1007* (2016.02); H01M 4/92 (2013.01); H01M 4/926 (2013.01); Y02P 70/56 (2015.11)

(58) Field of Classification Search
CPC ............. H01M 8/1007; H01M 4/8642; H01M 4/8605; H01M 4/92; H01M 4/926; Y02P 70/56
See application file for complete search history.

(56) References Cited

U.S. PATENT DOCUMENTS

| | | | |
|---|---|---|---|
| 8,597,856 | B2 | 12/2013 | Akasaka et al. |
| 2005/0130023 | A1* | 6/2005 | Lebowitz ............ H01M 4/8605 429/480 |
| 2005/0173244 | A1 | 8/2005 | Hayashi et al. |
| 2006/0105159 | A1* | 5/2006 | O'Hara ............... H01M 8/0234 428/318.6 |
| 2006/0257641 | A1 | 11/2006 | Cho et al. |
| 2008/0299430 | A1 | 12/2008 | Ichikawa et al. |
| 2009/0098440 | A1* | 4/2009 | Hodgkinson ....... H01M 4/8807 429/406 |
| 2009/0148739 | A1 | 6/2009 | Akasaka et al. |

FOREIGN PATENT DOCUMENTS

| | | |
|---|---|---|
| EP | 1 775 788 A1 | 4/2007 |
| JP | 2006-004879 A | 1/2006 |
| JP | 2007-214112 A | 8/2007 |
| JP | 2008-059917 A | 3/2008 |
| JP | 2008-243732 A | 10/2008 |
| JP | 4215979 B2 | 1/2009 |
| JP | 2009-289552 A | 12/2009 |
| JP | 2011-076739 A | 4/2011 |

OTHER PUBLICATIONS

Supplementary European Search Report dated Nov. 17, 2014, 5 pgs.
Canadian Office Action dated Feb. 26, 2015, 5 pages.
Chinese Office Action dated May 5, 2015, 6 pages.

* cited by examiner

FIG. 1
(a)
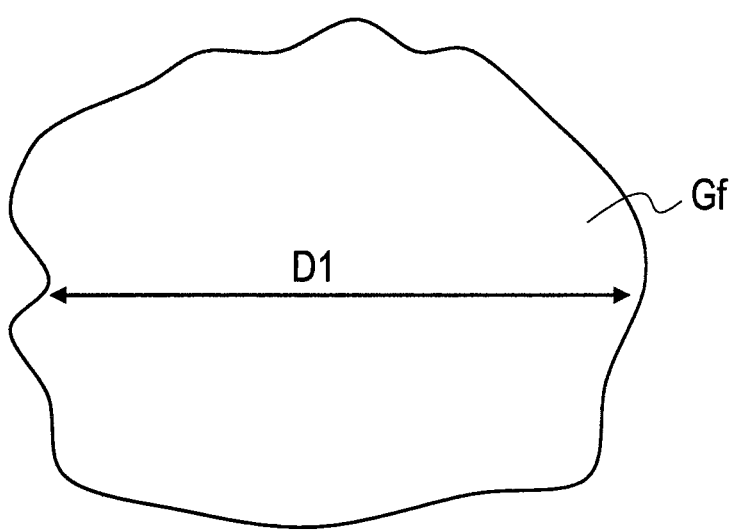
(b)
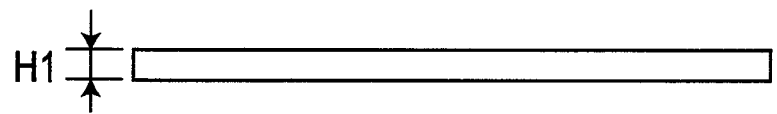

FIG. 2
(a)
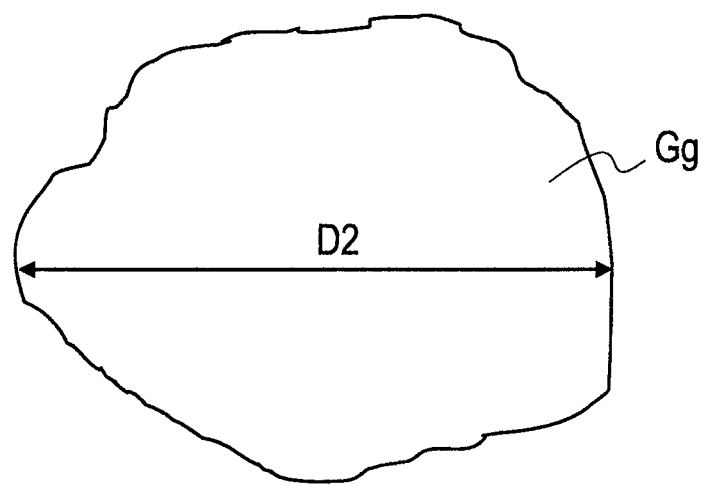
(b)
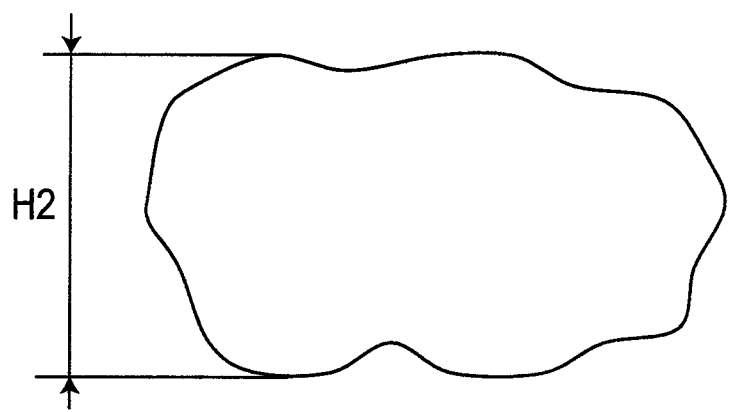

FIG. 8
(a)
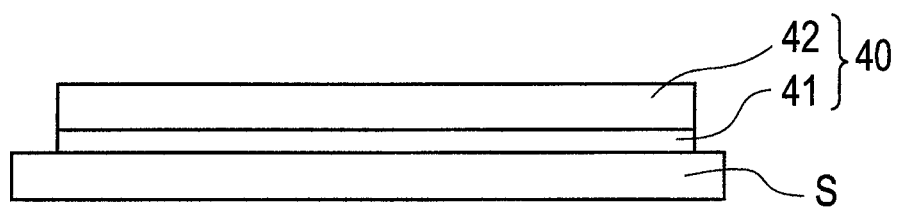
(b)
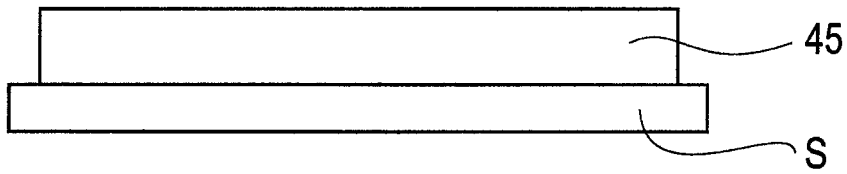

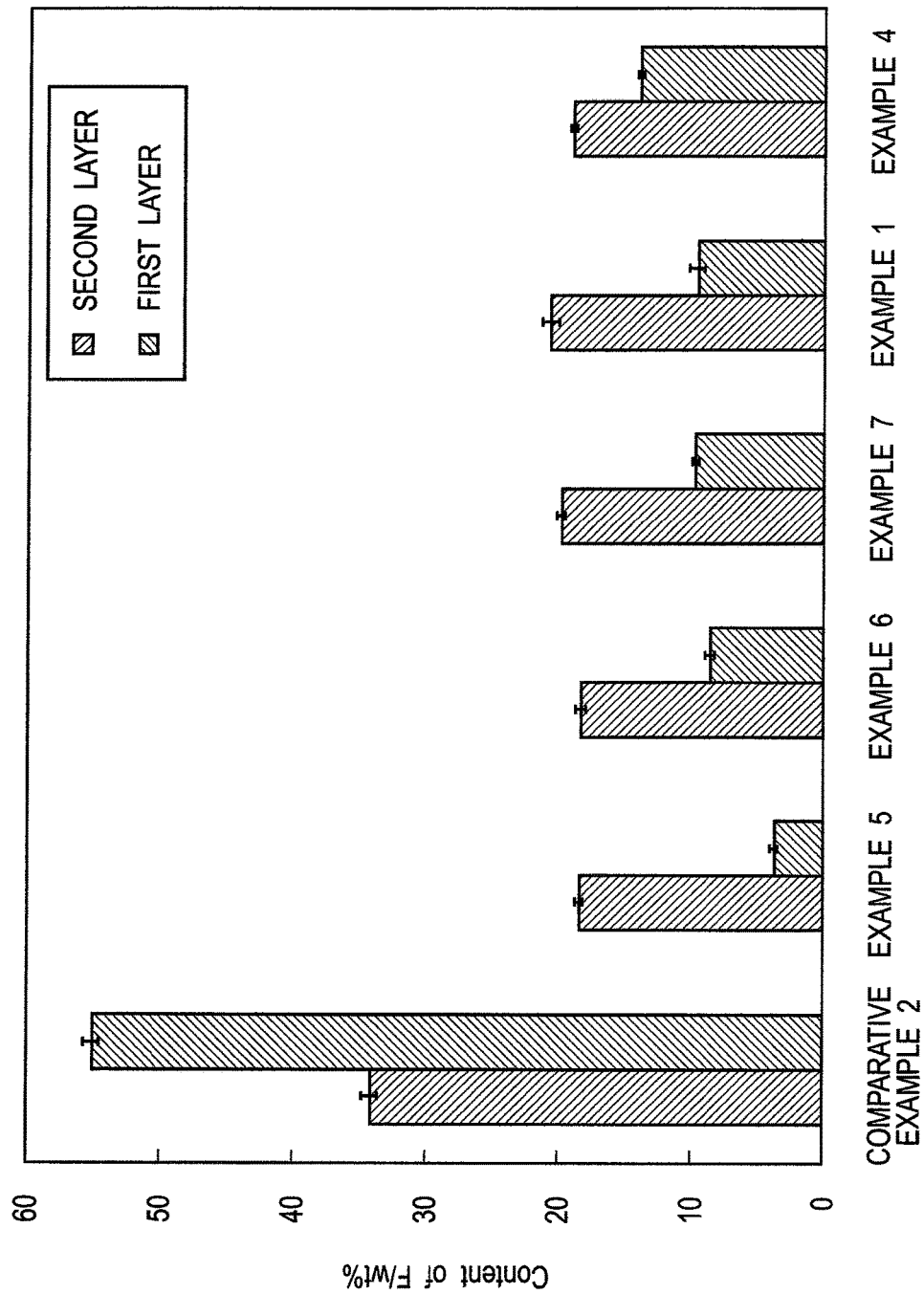

MICROPOROUS LAYER SHEET FOR FUEL CELL AND METHOD FOR PRODUCING THE SAME

TECHNICAL FIELD

The present invention relates to a microporous layer sheet serving as a microporous layer (MPL) that composes a gas diffusion layer (GDL) for use in a polymer electrolyte fuel cell (PEFC), and relates to a method for producing the microporous layer sheet.

BACKGROUND ART

A polymer electrolyte fuel cell that uses a proton-conductive polymer electrolyte membrane operates at a low temperature in comparison with other types of fuel cells, for example, such as a solid oxide fuel cell and a molten carbonate fuel cell. Therefore, the polymer electrolyte fuel cell is also expected as a power source for a mobile object such as an automobile, and practical application thereof has also been already started.

In general, a gas diffusion electrode for use in the polymer electrolyte fuel cell is composed of an electrode catalyst layer and a gas diffusion layer. The electrode catalyst layer is a layer that contains catalyst-carrying carbon fine particles coated with the same or different type of ion exchange resin (polyelectrolyte) as or from the polymer electrolyte membrane. Then, the gas diffusion layer has roles of supplying reaction gas to the catalyst layer and collecting electrical charges generated in the catalyst layer. Then, the gas diffusion electrode as described above is joined to the polymer electrolyte membrane in a state where a catalyst layer side thereof is opposed to the polymer electrolyte membrane concerned, whereby a membrane electrode assembly (MEA) is formed. A plurality of the membrane electrode assemblies as described above are stacked on one another while interposing therebetween separators including gas flow passages, whereby the polymer electrolyte fuel cell is configured.

As the gas diffusion layer for use in the polymer electrolyte fuel cell as described above, there is known a layer including a microporous layer, which mainly contains an electrically-conductive substance such as a carbon material, as an intermediate layer on the catalyst layer side of the gas diffusion layer. This intermediate layer is provided in order to lower electrical resistance between the gas diffusion layer and the catalyst layer and to improve a flow of the gas through the gas diffusion layer. As described above, the microporous layer is a layer that composes the gas diffusion layer together with a gas diffusion layer substrate. Hence, in a similar way to the whole of the gas diffusion layer, also for the microporous layer, not only excellent conductivity but also excellent gas permeability is required.

For the microporous layer, in order to allow the microporous layer to ensure drainage properties and strength, a hydrophobic binder is generally used in addition to carbon as such an electrically-conductive agent. As the hydrophobic binder, polytetrafluoroethylene (PTFE) is used in general. For example, in Patent Literature 1, there is disclosed a diffusion layer that contains unbaked and baked PTFE and an electrically-conductive substance.

CITATION LIST

Patent Literature

Patent Literature 1: Japanese Patent No. 4215979

SUMMARY OF INVENTION

The binder is added to the microporous layer as described above, and accordingly, maldistribution of the binder is caused in the microporous layer owing to dropping thereof by self-weight thereof. As a result that micropores in the microporous layer are closed as described above, a problem that such gas permeation performance of the microporous layer is significantly deteriorated occurs. Meanwhile, if the maldistribution is attempted to be suppressed by reducing loadings of the binder, then there occur such problems that lowering of the strength of the microporous layer is brought about, and that the drainage properties thereof become insufficient. For example, in such a diffusion membrane described in the foregoing Patent Literature 1, specific countermeasures against such problems as described above are not taken. Hence, in the diffusion membrane as described above, the maldistribution of the binder owing to the dropping thereof occurs, and the gas permeability required for the gas diffusion layer cannot be ensured sufficiently.

In this connection, it is an object of the present invention to provide a microporous layer sheet for a fuel cell, which is capable of ensuring the gas permeability and the drainage performance without lowering the strength, and contributes to performance enhancement of the polymer electrolyte fuel cell, and to provide a method for producing the microporous layer sheet.

A microporous layer sheet for a fuel cell according to an aspect of the present invention includes at least two microporous layers, which are stacked on a gas diffusion layer substrate, and contain a carbon material and a binder. Then, the microporous layer sheet for a fuel cell is characterized in that a content of the binder in the microporous layer as a first layer located on the gas diffusion layer substrate side is smaller than contents of the binder in the microporous layers other than the first layer.

A method for producing a microporous layer sheet for a fuel cell according to an aspect of the present invention includes a step of forming a microporous layer as a first layer by coating first ink containing a carbon material and a binder. The method is characterized in further including a step of stacking at least one microporous layer on the first layer by coating, on the first layer, ink containing the carbon material and the binder and having a higher concentration of the binder than in the first ink.

Furthermore, a gas diffusion layer for a fuel cell according to an aspect of the present invention is characterized in being configured by pasting, onto a gas diffusion layer substrate, a first layer side in the microporous layer sheet according to the present invention. Then, a membrane electrode assembly for a fuel cell according to an aspect of the present invention is characterized in being configured by stacking the gas diffusion layers for a fuel cell according to the present invention on both surfaces of an electrolyte membrane while interposing catalyst layers between the gas diffusion layers and both surfaces of the electrolyte membrane.

BRIEF DESCRIPTION OF DRAWINGS

FIGS. 1(a) and 1(b) show a shape of scale-like graphite that composes a microporous layer sheet for a fuel cell according to an embodiment of the present invention: FIG. 1(a) is a plan view; and FIG. 1(b) is a side view.

FIGS. 2(a) and 2(b) show a shape of granular graphite that composes the microporous layer sheet for a fuel cell according to the embodiment of the present invention: FIG. 2(a) is a plan view; and FIG. 2(b) is a side view.

FIGS. 8(a) and 8(b) are individual cross-sectional views showing structures of an example and a comparative example in accordance with the microporous layer sheet for a fuel cell according to the present invention while comparing the structures with each other: FIG. 8(a) shows the example; and FIG. 8(b) shows the comparative example.

FIG. 16 is a graph showing contents of a binder in upper surfaces and lower surfaces of the microporous layers of Examples 1 and 4 to 7 and Comparative example 2 while comparing the contents with one another.

DESCRIPTION OF EMBODIMENTS

Figure 3:
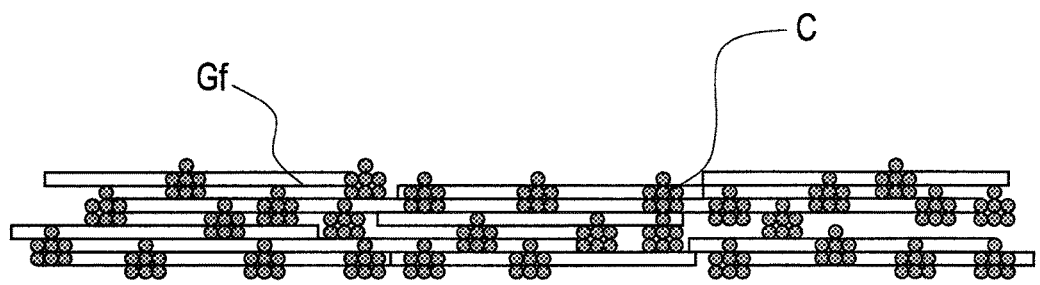
FIG. 3 is a schematic cross-sectional view schematically showing an example of using a carbon material, which is composed of large-diameter scale-like graphite and carbon black, as an example of a cross-sectional structure of the microporous layer sheet for a fuel cell according to the embodiment of the present invention.

A more specific description is made of a microporous layer sheet (MPL sheet) for a fuel cell according to the present invention together with a method for producing the microporous layer sheet, with a gas diffusion layer (GDL) for the fuel cell, which is composed by using the microporous layer sheet, and with a membrane electrode assembly (MEA) for a fuel cell, which is composed by using the GDL concerned. Note that, in the MPL sheet according to the present invention, a microporous layer as "a first layer" is formed first in the event of producing the sheet concerned, and is located on a lowermost side of the sheet. Hence, for convenience of explanation, "the first layer" is referred to as "a lowermost layer" in some case. Moreover, in this embodiment, "%" represents a mass percentage unless particularly specified. Furthermore, for convenience of explanation, dimensional ratios in the drawings are exaggerated, and are different from actual ratios in some case.

As described above, the MPL sheet according to an embodiment of the present invention includes at least two microporous layers, which are stacked on a gas diffusion layer substrate, and contain a carbon material and a binder. Then, the MPL sheet is characterized in that a content of the binder in the microporous layer as the first layer located on the gas diffusion layer substrate side is smaller than contents of the binder in microporous layers other than the foregoing first layer. Note that, desirably, a thickness of the MPL sheet according to this embodiment is within an approximate total range from 10 to 100 μm. Moreover, desirably, a thickness of the first layer is 5 to 60% of that of the whole of the MPL sheet.

In usual, the GDL including the MPL has a stacked structure of the GDL substrate and the MPL formed by being wet-coated thereon. However, in such a method for forming the MPL, MPL ink enters the GDL substrate, and the GDL substrate clogs, and accordingly, gas permeability of the GDL is deteriorated. Moreover, irregularities on a surface of the GDL substrate remain even after the MPL is formed by ink coating, and accordingly, a relief effect for attack of GDL substrate fiber to an electrolyte membrane is small.

As opposed to this, the MPL sheet according to this embodiment has an independent sheet shape, and the ink is not directly coated onto the GDL substrate, but the MPL sheet is pasted onto the substrate concerned, whereby the GDL is formed. Hence, the substrate does not clog by the entrance of the ink. Moreover, the irregularities on the surface of the substrate are absorbed by pasting the sheet thereonto. As described above, the foregoing problem regarding the attack to the electrolyte membrane by the substrate fiber is solved by the MPL sheet according to this embodiment.

Note that, in the case of the microporous layer sheet that employs such a single layer structure, maldistribution of the binder in the MPL is caused owing to dropping thereof by self-weight thereof, micropores of the MPL are thereby closed, and gas permeation performance of the MPL is significantly deteriorated. As opposed to this, in the present invention, the MPL is allowed to have a multilayer structure, in which the content of the binder in the first layer (lowermost layer) is set low. In such a way, the maldistribution of the binder by the self-weight is relieved. Moreover, gas permeability and drainage properties under high-humidity operating conditions are enhanced.

As described above, the MPL sheet according to this embodiment is a sheet with the multilayer structure, which includes at least two macroporous layers, each containing the carbon material and the binder. The MPL sheet is pasted onto the GDL substrate, whereby the GDL is formed. Then, from a viewpoint of suppressing the maldistribution of the binder by the self-weight, the MPL sheet is configured so that the content of the binder in the MPL as the first layer can be smaller than the contents of the binder in upper layer-side MPLs as other layers than the first layer.

As the carbon material that composes the respective layers of the MPL sheet according to this embodiment, scale-like graphite, carbon black and granular graphite can be used. It is particularly desirable that the respective layers be composed by using at least the scale-like graphite. Note that, as the scale-like graphite, a large-diameter one in which a particle diameter, that is, a mean planar diameter D1 ranges from 5 to 50 μm and a small-diameter one in which a mean planar diameter is less than 5 μm can be used in combination with each other.

The scale-like graphite has high crystallinity, and as shown in a plan view of FIG. 1(a) and a side view of FIG. 1(b), has a scale-like shape in which an aspect ratio (mean planar diameter D1/thickness H1) is high. The scale-like graphite of this embodiment stands for graphite, in which the thickness H1 approximately ranges from 0.05 to 1 and the foregoing aspect ratio approximately ranges from 10 to 1000. The scale-like graphite contributes to enhancement of gas permeability of the MPL in a thickness direction and a plane direction. Moreover, the scale-like graphite contributes to resistance of the MPL in the plane direction, that is, electrical conductivity enhancement thereof in the plane direction. From such a viewpoint, scale-like graphite in which the mean planar diameter D1 ranges from 5 to 50 μm is preferably used. The scale-like graphite in which a value of D1 ranges as described above is particularly referred to as large-diameter scale-like graphite Gf. When the mean planar diameter D1 is smaller than 5 μm, there is no effect for the enhancement of the gas permeability, and when the mean planar diameter D1 is larger than 50 μm, electrical conductivity of the MPL in the thickness direction tends to be deteriorated. Note that the mean planar diameter D1 of the scale-like graphite Gf stands for a mean diameter thereof in a flat plane direction, which is measured by a laser diffraction/scattering method. Moreover, the thickness H1 of the scale-like graphite can be measured by a scanning electron microscope (SEM) or a transmission electron microscope (TEM).

Meanwhile, granular graphite Gg has high crystallinity in a similar way to the above. In the granular graphite Gg, an aspect ratio (mean planar diameter D2/thickness H2) thereof approximately ranges from 1 to 3 as shown in FIGS. 2(a) and 2(b). Then, the granular graphite Gg functions as a spacer material that enhances the gas permeability concerned in the thickness direction and the plane direction. Here, the spacer material is a material, which extends a distance between pieces of the scale-like graphite by interposing between the pieces concerned, and enhances permeability of reaction gas such as fuel gas and oxidant gas. Note that, desirably, a mean particle diameter of the granular graphite approximately ranges from 1 to 10 μm from a viewpoint of allowing the granular graphite to function as the spacer material. Note that, in this specification, as a value of "the mean particle diameter", a value is employed, which is calculated as a mean value of particle diameters of particles observed in several to several ten visual fields by using such an observation unit as the scanning electron microscope (SEM) and the transmission electron microscope (TEM). Here, "the particle diameter" stands for a maximum distance among distances, each of which is between arbitrary two points on outlines of the particles (observed surfaces) observed by using the observation unit such as the scanning electron microscope (SEM) and the transmission electron microscope (TEM). Particle diameters and mean particle diameters of other constituent components can also be defined in a similar way. Moreover, the mean planar diameter D2 and thickness H2 of the granular graphite can be measured in a similar way to the case of the foregoing scale-like graphite.

Note that, in the case where the mean planar diameter D1 of the scale-like graphite is less than 5 μm, the scale-like graphite is particularly referred to as small-diameter scale-like graphite Gfs. The small-diameter scale-like graphite Gfs functions as an electrically-conductive path material that reduces electrical resistance of the MPL in the thickness direction. Here, the electrically-conductive path material is a material, which interposes between the pieces of the scale-like graphite, and enhances electrical conductivity between the pieces of the scale-like graphite. Moreover, by the small-diameter scale-like graphite Gfs, thermal resistance of the MPL is lowered, that is to say, thermal conductivity thereof is enhanced. As a result, electrical conductivity of the MPL in a low humidity state is enhanced. In the case of using the small-diameter scale-like graphite Gfs as described above, desirably, a compounding ratio thereof in the MPL is set within an approximate range of 30 to 70% from a viewpoint of striking a balance between the enhancement of the gas permeability and the enhancement of the electrical conductivity. That is to say, if the compounding ratio of the small-diameter scale-like graphite Gfs is smaller than 30%, then a contact area thereof is lowered, and the resistance cannot be lowered sufficiently. Meanwhile, if the compounding ratio is larger than 70%, then an amount of the binder becomes relatively small, and it becomes difficult for the MPL to function as the MPL itself. However, in the case where the particle diameters of the scale-like graphite can be made as small as that of carbon black to be described later, preferably, the compounding ratio of the small-diameter scale-like graphite Gfs is set at a compounding ratio as small as that of the carbon black. Note that the mean planar diameter D1 and thickness H1 of the small-diameter scale-like graphite can also be measured in a similar way to the case of the foregoing scale-like graphite.

As such a carbon material functioning as the electrically-conductive path material that reduces the resistance in the thickness direction, the carbon black is mentioned. Specifically, oil furnace black, acetylene black, thermal black, channel black and the like can be used. Preferably, a mean particle diameter of the electrically-conductive path material as described above is approximately 10 nm to 5 μm.

In the case of using the acetylene black among the foregoing electrically-conductive path materials, with regard to loadings of the acetylene black, desirably, a content thereof in the MPL is set at 5 to 25% from a viewpoint of more surely striking the balance between the enhancement of the gas permeability and the enhancement of the electrical conductivity. If the content of the acetylene black is smaller than 5%, then a contact area thereof is lowered, and the resistance is not lowered sufficiently. Meanwhile, if the content is larger than 25%, then small-diameter particles fill vacancies, and accordingly, the gas permeability is deteriorated. Moreover, desirably, acetylene black with a specific surface area of 1000 $m^2/g$ or more is used, whereby the resistance can be further reduced.

Then, together with the carbon material described above, the binder for use in the MPL sheet according to the present invention is a member having a function to bind pieces of the foregoing carbon material to one another and to thereby ensure strength of the MPL, and desirably, is provided with a function as a water repellent. Such binder resin is not particularly limited; however, polytetrafluoroethylene (PTFE) can be used. Besides, polyvinylidene fluoride (PVDF), polyvinyl fluoride (PCF), styrene-based elastomer resin such as SEBS, and the like can also be applied.

FIGS. 3 to 6 are enlarged schematic views schematically showing structure examples of the respective layers in the MPL sheets configured by combining a variety of the carbon materials described above with one another. FIG. 3 is a view showing an example where the MPL sheet is composed of the scale-like graphite, the carbon black and the binder (not shown). In this case, the pieces of the scale-like graphite Gf, which are formed into a thin shape, are oriented substantially in parallel to one another in a state of going along a plane direction of layers thereof. As a result, the gas permeability of the MPL in the thickness and plane directions and the electrical conductivity thereof in the plane direction can be ensured. Meanwhile, the carbon black C interposes as the electrically-conductive path material between the pieces, and thereby performs a function to enhance the electrical conductivity in the thickness direction.

Figure 4:
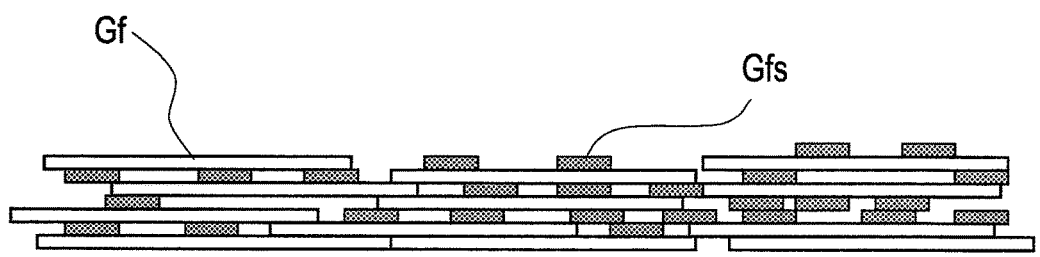
FIG. 4 is a schematic cross-sectional view schematically showing an example of using a carbon material, which is composed of large-diameter and small-diameter scale-like graphite, as an example of the cross-sectional structure.
Figure 5:
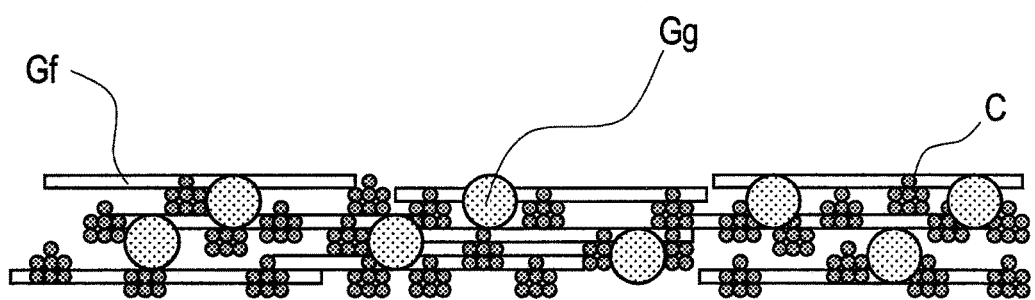
FIG. 5 is a schematic cross-sectional view schematically showing an example of using a carbon material, which is composed of the large-diameter scale-like graphite, the carbon black and the granular graphite, as an example the cross-sectional structure.

FIG. 4 shows an example where, as the carbon materials, the pieces of the large-diameter and small-diameter scale-like graphite are combined with each other. In a similar way to the carbon black, the small-diameter scale-like graphite Gfs interposes between the pieces of the large-diameter scale-like graphite Gf, functions as the electrically-conductive path material, and enhances the electrical conductivity in the thickness direction. Moreover, FIG. 5 shows an example where the MPL sheet is configured by combining, as the carbon materials, the scale-like graphite, the carbon black and the granular graphite with one another. In addition to that the scale-like graphite Gf and the carbon black C function in a similar way to the case of the structure example of FIG. 3, the granular graphite Gg functions as the spacer material that enhances the gas permeabilities in the thickness and plane directions.

Figure 6:
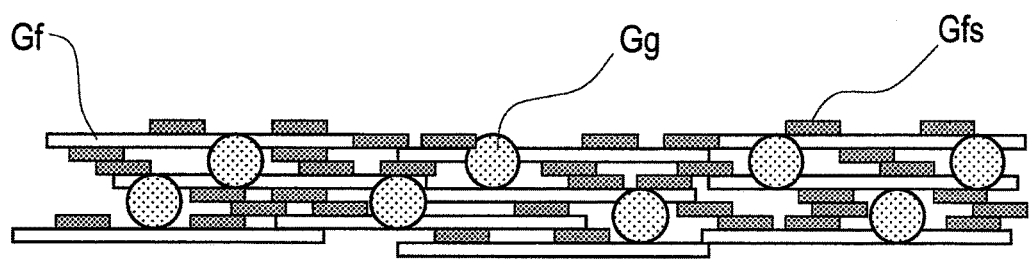
FIG. 6 is a schematic cross-sectional view schematically showing an example of using a carbon material, which is composed of the large-diameter and small-diameter scale-like graphite and the granular graphite, as an example the cross-sectional structure.

FIG. 6 shows a structure example where the MPL sheet is configured by combining the large-diameter scale-like graphite Gf, the small-diameter scale-like graphite Gfs and the granular graphite Gg with one another. Also in this case, the large-diameter scale-like graphite Gf ensures the gas permeability in the thickness direction and the gas permeability and the electrical conductivity in the plane direction. Then, the small-diameter scale-like graphite Gfs and the granular graphite Gg function as the electrically-conductive path material and the spacer material, respectively.

Note that the structure examples of the MPL according to the combinations of the carbon materials, which are shown in FIGS. 3 to 6, are merely representative examples. For example, with regard to the structure shown in FIG. 3, besides the above, a variety of combinations are conceived such as combinations obtained by addition of the small-diameter scale-like graphite Gfs and by further addition of the granular graphite Gg. Moreover, the MPL sheet according to this embodiment is a sheet including at least two MPLs with the structure as described above; however, it is not always necessary that the respective layers have the same combination of the carbon materials. That is to say, any problem does not occur even if the layer structures as shown in FIGS. 3 to 6 are mixed.

As described above, the MPL sheet according to this embodiment is a sheet including at least two MPLs, which contain the carbon material and the binder, and are different in content of the binder from each other. Here, such a multilayer structure can also be formed on a holding sheet. In such a way, productivity and handling easiness of the sheet concerned can be enhanced. That is to say, the holding sheet is a sheet, which holds the MPL sheet, and enhances the productivity and handling easiness of the MPL sheet. The holding sheet in this case is not particularly limited as long as the holding sheet concerned is provided with heat resistance and chemical stability, which are enough to endure baking treatment at approximately 300° C. For example, films made of polyimide, polypropylene, polyethylene, polysulfone, polytetrafluoroethylene and the like can be used. Note that the film made of the polyimide can be suitably used among them. Moreover, a film with a thickness approximately ranging from 10 to 100 µm is preferably used.

Figure 9:
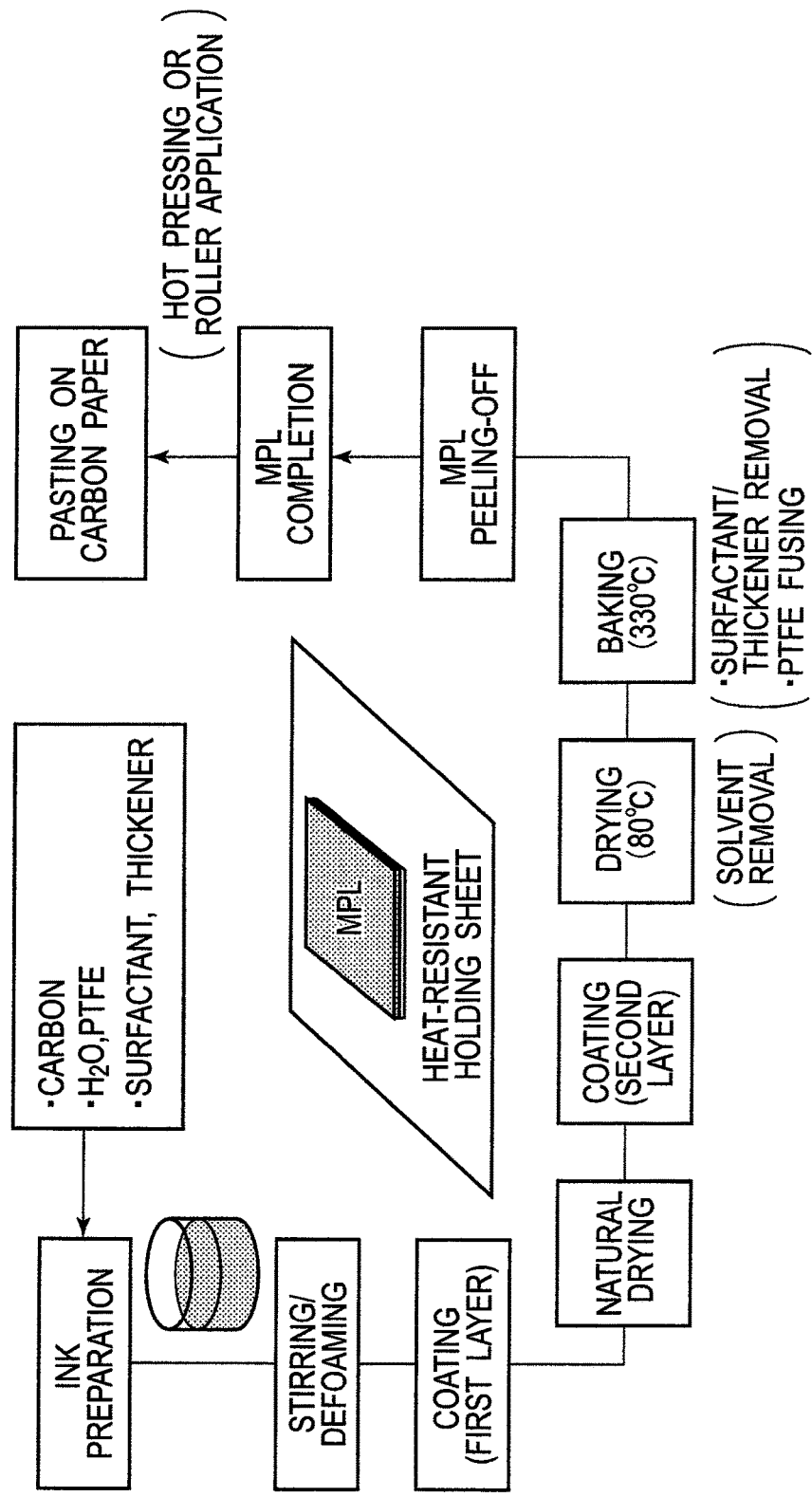
FIG. 9 is a process chart showing a procedure of fabricating the microporous layer sheet for a fuel cell according to the embodiment of the present invention and a procedure of fabricating a gas diffusion layer by using the microporous layer sheet for a fuel cell.

Moreover, for example, the MPL sheet according to this embodiment can be produced by steps shown in FIG. 9. That is to say, first ink containing the carbon material and the binder is coated on such a heat-resistant holding sheet as described above, and the microporous layer as the first layer (lowermost layer) is formed. Then, ink containing the carbon material and the binder in a similar way, in which a concentration of the binder is higher than in the foregoing first ink, is coated on the first layer, whereby at least one microporous layer is stacked.

Moreover, the first layer side of the MPL sheet according to this embodiment is pasted onto the GDL substrate, whereby the GDL for a fuel cell can be formed. As this GDL substrate, a member is used, which is obtained by immersing PTFE or the like as a water repellent into a material formed of carbon fiber of carbon paper, carbon cloth, nonwoven fabric or the like. Note that whether or not the substrate is to be subjected to water-repellent treatment depends on drainage characteristics of an MEA to which the GDL as described above is applied and on surface property of the separator. The substrate may be subjected to hydrophilic treatment. Moreover, the graphite, the carbon black or a mixture thereof may also be immersed into the foregoing GDL substrate. The GDL according to this embodiment, which is as described above, applies the MPL according to this embodiment, and accordingly, can ensure the gas permeability and the drainage performance without allowing the strength to be lowered.

Figure 7:
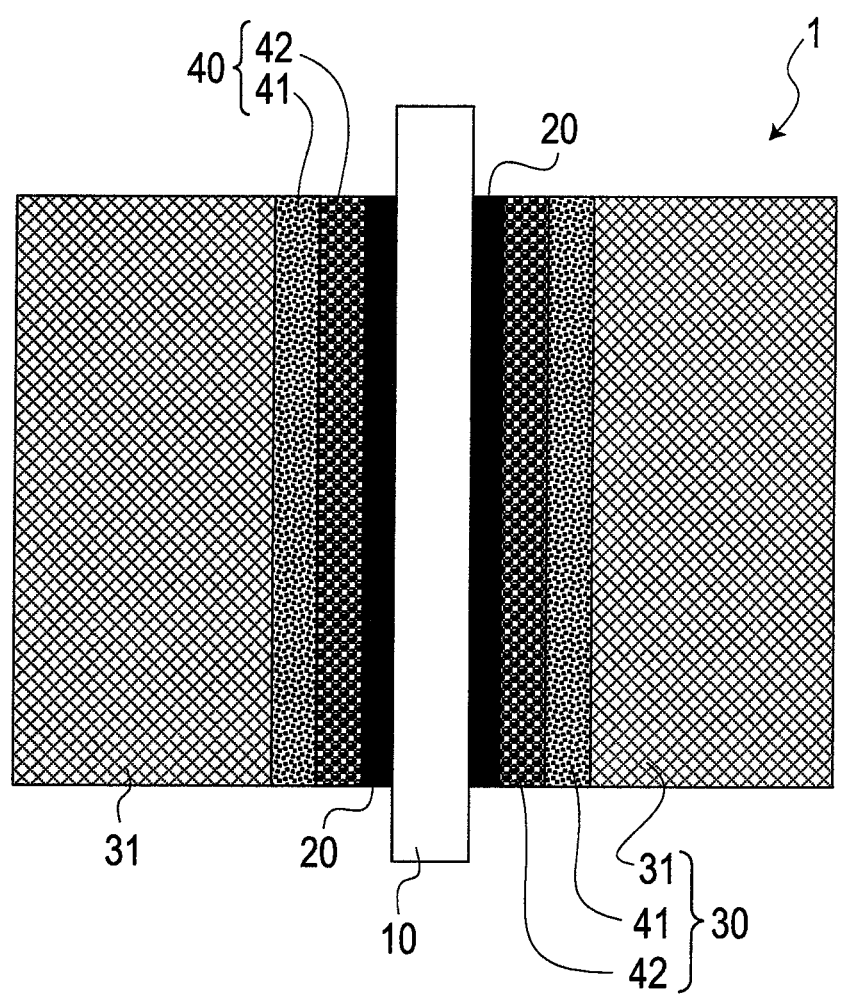
FIG. 7 is a schematic cross-sectional view showing a structure example of a membrane electrode structure for a fuel cell, which uses the microporous layer sheet for a fuel cell according to the present invention.

FIG. 7 shows a structure example of the MEA configured by using the GDL fabricated by the MPL sheet according to this embodiment. An MEA 1 is an assembly, in which catalyst layers 20 and GDLs 30 are individually arranged on an anode and a cathode, which are both electrodes taking an electrolyte membrane 10 as a center thereof. Here, each of the GDLs 30 is formed by pasting the MPL sheet according to this embodiment, that is, an MPL sheet 40 with a two-layer structure, which is composed of a first MPL 41 and a second MPL 42, onto a GDL substrate 31. Note that such pasting refers not to formation of a layer by simply coating a material on an adhesion surface but to joining of an independently molded material onto the adhesion surface. Moreover, a content of the binder in the first MPL 41 on a lower layer side is set smaller than a content of the binder in the second MPL 42 on an upper layer side. The MEA according to this embodiment, which is as described above, applies the GDL according to this embodiment. Accordingly, the gas permeability and the drainage performance are ensured without allowing the strength to be lowered, and the power generation performance can be ensured even under damp and wet conditions.

As the electrolyte membrane 10, a hydrocarbon-based electrolyte membrane can also be used as well as a perfluorosulfonic acid-based electrolyte membrane used in general. As a perfluorosulfonic acid-based electrolyte, specifically, there are mentioned Nafion (registered trademark, made by DuPont Corporation), Aciplex (registered trademark, made by Asahi Kasei Corporation), Flemion (registered trademark, made by Asahi Glass Co., Ltd.), and the like. Moreover, as a hydrocarbon-based electrolyte, there are mentioned hydrocarbon-based resin having a sulfonic acid group, one in which inorganic acid such as phosphoric acid is doped into a hydrocarbon-based polymer compound, an organic/inorganic hybrid polymer partially substituted for a functional group of a proton conductor, a proton conductor in which a phosphoric acid solution or a sulfuric acid solution is immersed into a polymer matrix, and the like. However, such a hydrocarbon-based polymer electrolyte having a sulfonic acid group is preferable in consideration of oxidation resistance, low gas permeability, easiness and low cost in production, and the like. As suitable examples of the hydrocarbon-based electrolyte for use in this embodiment, for example, there are mentioned sulfonated polyaryl ether sulfone (S-PES), polybenzimidazole (PBI), polybenzoxazole (PBO), sulfonated polyphenoxybenzoyl phenylene (S-PPBP), sulfonated polyether ether ketone (S-PEEK), and the like.

Moreover, each of the catalyst layers 20 is formed in such a manner that a perfluorosulfonic acid-based electrolyte solution or a hydrocarbon-based electrolyte solution is mixed into one in which platinum or a platinum alloy is carried on carbon. Here, as the carbon, there can be used: carbon black such as oil furnace black, acetylene black, Ketjen black, thermal black and channel black; graphite; activated carbon; and the like. Note that a water repellent and a pore forming material can also be added to the catalyst layer 20 according to needs.

As a method for fabricating the MEA as described above, there is a method of joining the GDLs 30, which is configured by pasting the MPL sheets onto the GDL substrates, to one in which the catalyst layers are transferred by hot pressing or directly coated onto the electrolyte membrane. Moreover, there is a method of joining those, in which the catalyst layers 20 are coated in advance to the MPL sides of the GDLs, to the electrolyte membrane by the hot pressing. Either of these methods may be used. At this time, coating conditions for the hot pressing, joining conditions, and the like are also appropriately changed depending on which the perfluorosulfonic acid-based substance or the hydrocarbon-based substance is to be used for the electrolyte in the electrolyte membrane and the catalyst layers.

Each of the GDLs for a fuel cell according to this embodiment can be produced by steps as shown in FIG. 9. That is to say, first, the MPL ink is prepared, which contains the scale-like graphite and the binder, and according to needs, further contains the carbon black or the granular graphite as the electrically-conductive path material and the spacer material, a surfactant, and a thickener.

Next, after being subjected to stirring and defoaming treatment, the MPL ink is coated onto the heat-resistant holding sheet, and for example, is dried at 80° C. and baked at 330° C., whereby the sheet-like MPL (MPL sheet) is obtained.

Then, the MPL sheet peeled off from the holding sheet is pasted onto the GDL substrate composed, for example, of carbon paper subjected to water-repellent treatment, whereby the GDL can be obtained. Such pasting can be performed, for example, by the hot pressing. Unlike such a layer obtained by directly coating the ink onto the GDL substrate, in the GDL obtained by the method as described above, the MPL sheet prepared separately is pasted onto the GDL substrate. As a result, the substrate does not clog by the entrance of the ink, and the gas permeability of the GDL is enhanced. Moreover, the irregularities on the surface of the substrate are absorbed. As a result, the attack to the electrolyte membrane by the GDL substrate fiber can be relieved, and the electrical conductivity of the GDL is enhanced.

EXAMPLES

A specific description is made below of the present invention based on examples; however, the present invention is not limited only to these examples.

Example 1

As the ink for forming the MPL sheet, there were used: scale-like graphite, in which a mean planar diameter is 15 μm, a thickness is 0.1 μm, and a specific surface area is 6 m²/g; acetylene black, in which a primary particle diameter is 40 nm, and a specific surface area is 37 m²/g; and PTFE as the binder. MPL ink for the first layer was prepared, which contains the foregoing scale-like graphite, the acetylene black and the PTFE in a ratio of 83.1%, 11.9% and 5%, respectively. Moreover, MPL ink for the second layer was prepared, which contains the foregoing scale-like graphite, the acetylene black and the PTFE in a ratio of 61.3%, 8.8% and 30%, respectively. Then, onto a heat-resistant holding sheet composed of a polyimide film with a thickness of 50 μM, the MPL ink for the first layer was coated, and was naturally dried. Thereafter, onto the MPL ink for the first layer, the ink for the second layer was coated, and was dried at 80° C., followed by baking at 330° C. In such a way, as shown in FIG. 8(a), on such a holding sheet S, there was obtained the MPL sheet 40 with a two-layer structure with a total thickness of 60 μM, the MPL sheet 40 including two layers, which are the MPL 41 with a thickness of 30 μm and the MPL 42 with a thickness of 30 μm.

Next, the sheet composed of the two MPLs was peeled off from the holding sheet, and was joined by the hot pressing onto a GDL substrate composed of carbon paper with a thickness of 200 μm, which is subjected to 10% water-repellent treatment by the PTFE, whereby each of the GDLs was obtained. The hot pressing was performed under conditions of 80° C., 2 MPa, and 3 minutes. Note that the steps described above are based on FIG. 9. Then, one, in which the catalyst layers composed of the platinum-carried carbon and the perfluorosulfonic acid-based electrolyte solution are formed on a perfluorosulfonic acid-based electrolyte membrane with a thickness of 25 μm, was sandwiched by the GDLs obtained in such a manner as described above, whereby the MEA was obtained. Note that a carried amount of the platinum-carried carbon was set at 0.05 mg/cm² on the anode side, and at 0.35 mg/cm² on the cathode side.

Comparative Example 1

The MPL ink prepared for the second layer in Example 1 was coated onto the heat-resistant holding sheet composed of the polyimide film with a thickness of 50 μm, and was dried at 80° C. Thereafter, operations similar to those described above were repeated except that the baking was performed at 330° C. In such a way, as shown in FIG. 8(b), a single MPL sheet 45 with a thickness of 60 μm was obtained on the holding sheet S. Subsequently, the MPL sheet was peeled off from the holding sheet, was hot-pressed onto the GDL substrate in a similar way, and was formed into a GDL, and thereafter, an MEA was obtained by similar operations.

Example 2

MPL ink containing the foregoing scale-like graphite, the acetylene black and the PTFE in a ratio of 78.8%, 11.3% and 10%, respectively was used for the first layer, and MPL ink containing these components in a ratio of 52.5%, 7.5% and 40.0%, respectively was used for the second layer. Except for the above, similar operations to those of Example 1 were repeated, whereby an MPL sheet of Example 2 was obtained. Subsequently, the MPL sheet was hot-pressed onto the same substrate, whereby each of GDLs was formed. Then, an MEA was obtained by similar operations to those of Example 1 except for using a perfluorosulfonic acid-based electrolyte membrane with a thickness of 15 µm.

Example 3

As the MPL ink for the second layer, there was used ink containing the foregoing scale-like graphite, the acetylene black and the PTFE in a ratio of 60.0%, 10.0% and 30%, respectively. Except for the above, similar operations to those of Example 2 were repeated, whereby an MPL sheet of Example 3 was obtained. Then, on and after such obtainment of the MPL sheet, similar operations to those of Example 2 were repeated, whereby each of GDLs was formed, and further, an MEA was obtained.

Example 4

As the MPL ink for the second layer, there was used ink containing the foregoing scale-like graphite, the acetylene black and the PTFE in a ratio of 61.3%, 8.8% and 30%, respectively. That is to say, the ink used herein is the same as that of the second layer of Example 1. Except for the above, similar operations to those of Examples 2 and 3 were repeated, whereby an MPL sheet of Example 4 was obtained. Then, on and after such obtainment of the MPL sheet, similar operations to those of Examples 2 and 3 were repeated, whereby each of GDLs was formed, and further, an MEA was fabricated.

Comparative Example 2

By similar operations to those of Comparative example 1, a sheet of a single MPL was obtained by using ink containing the foregoing scale-like graphite, the acetylene black and the PTFE in a ratio of 43.8%, 6.3% and 50%, respectively. Then, on and after such obtainment of the MPL sheet, similar operations to those of Examples 2 to 4 were repeated, whereby each of GDLs was formed, and further, an MEA was obtained.

Specifications of the MPL sheets of Examples and Comparative examples, which were fabricated in the manners described above, are shown collectively in Table 1.

TABLE 1

| Section | Component composition of first layer (%) | | | Component composition of second layer (%) | | |
|---|---|---|---|---|---|---|
| | Scale-like graphite | Acetylene black | PTFE | Scale-like graphite | Acetylene black | PTFE |
| Example 1 | 83.1 | 11.9 | 5.0 | 61.3 | 8.8 | 30.0 |
| Comparative Example 1 | 61.3 | 8.8 | 30.0 | — | — | — |
| Example 2 | 78.8 | 1.13 | 10.0 | 52.5 | 7.5 | 40.0 |
| Example 3 | 78.8 | 1.13 | 10.0 | 60.0 | 10.0 | 30.0 |
| Example 4 | 78.8 | 1.13 | 10.0 | 61.3 | 8.8 | 30.0 |
| Comparative Example 2 | 43.3 | 6.3 | 50.0 | — | — | — |

[Measurement of Gas Permeability of MPL in Thickness Direction]

The gas permeability of each of the MPLs in the thickness direction was evaluated by using a Gurley permeability tester. By using the Gurley permeability tester specified in the Gurley Permeability JIS (Japanese industrial standards) P8117, a time (second) taken until air of 100 cc (0.1 dm$^3$) passes through a sample pressed against a clamp plate having a circular hole with an outer diameter of 28.6 mm was measured, and Gurley permeability was measured. By using a value thus obtained, permeability (unit: m$^2$) standardized by thickness was calculated.

Figure 10:
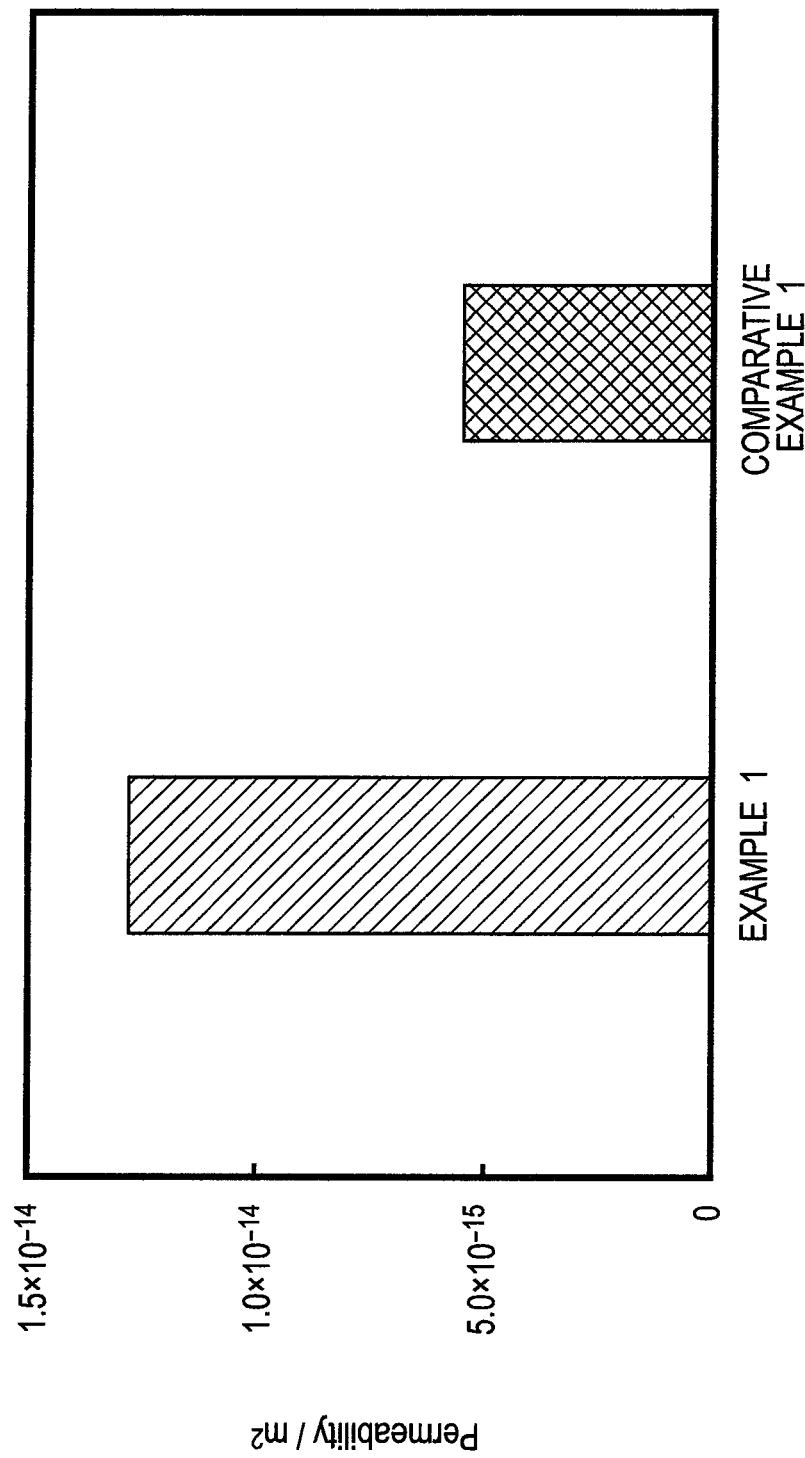
FIG. 10 is a graph showing gas permeabilities in a thickness direction of microporous layers of Example 1 and Comparative example 1 while comparing the gas permeabilities with each other.
Figure 11:
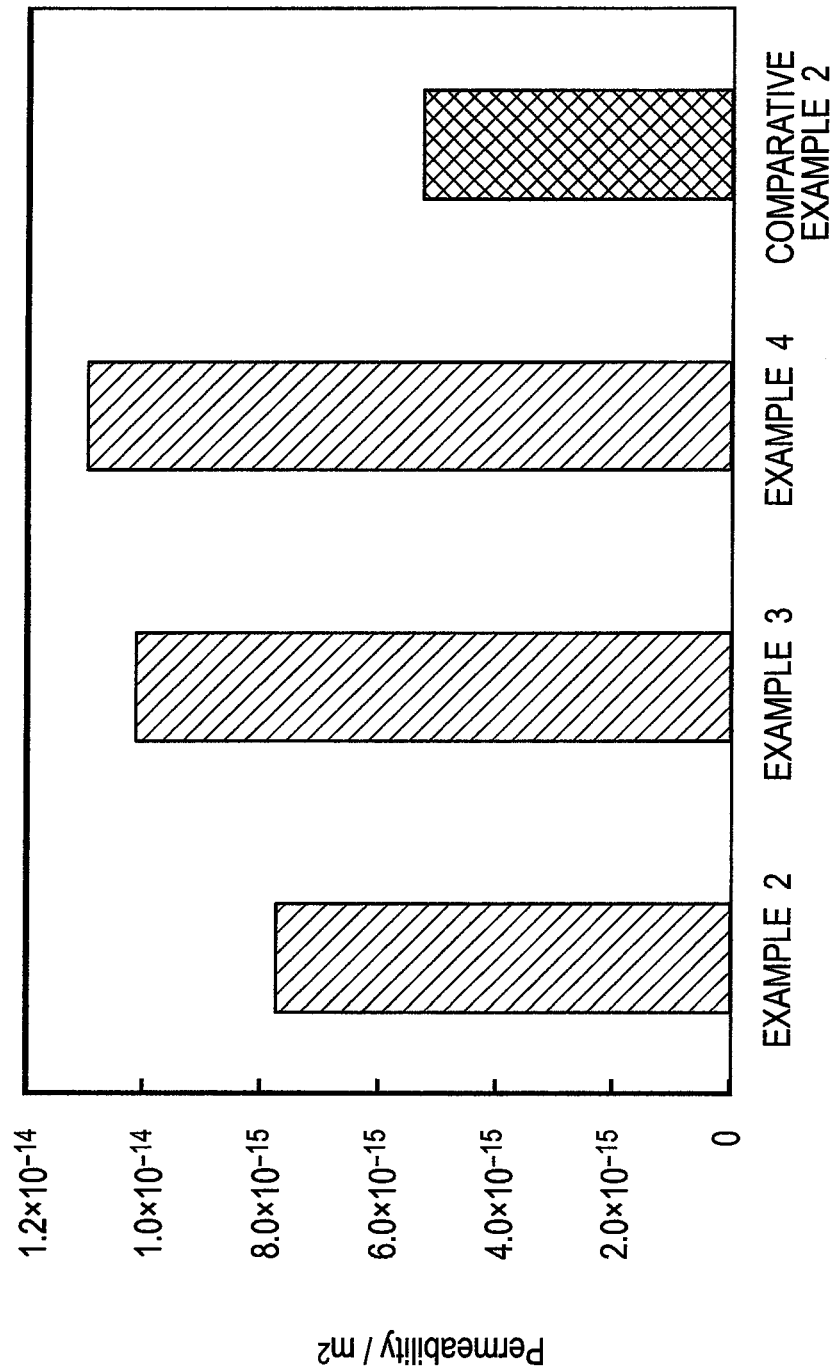
FIG. 11 is a graph showing gas permeabilities in a thickness direction of microporous layers of Examples 2 to 4 and Comparative example 2 while comparing the gas permeabilities with one another.

Measurement results of the gas permeabilities of the MPLs in the thickness direction, which are obtained by Example 1 and Comparative example 1, are shown in FIG. 10. It was confirmed that, in comparison with Comparative example 1 in which the MPL has the single layer structure, the gas permeability in Example 1 in which the MPL has the two-layer structure is enhanced. Moreover, measurement results of the gas permeabilities of the MPLs in the thickness direction, which are obtained by Examples 2 to 4 and Comparative example 2, are shown in FIG. 11. It was confirmed that, in comparison with Comparative example 2 in which the MPL has the single layer structure, the gas permeabilities in Examples 2 to 4, in each of which the MPL has the two-layer structure, are enhanced.

[Measurement of Electrical Resistance of MPL in Thickness Direction]

Figure 12:
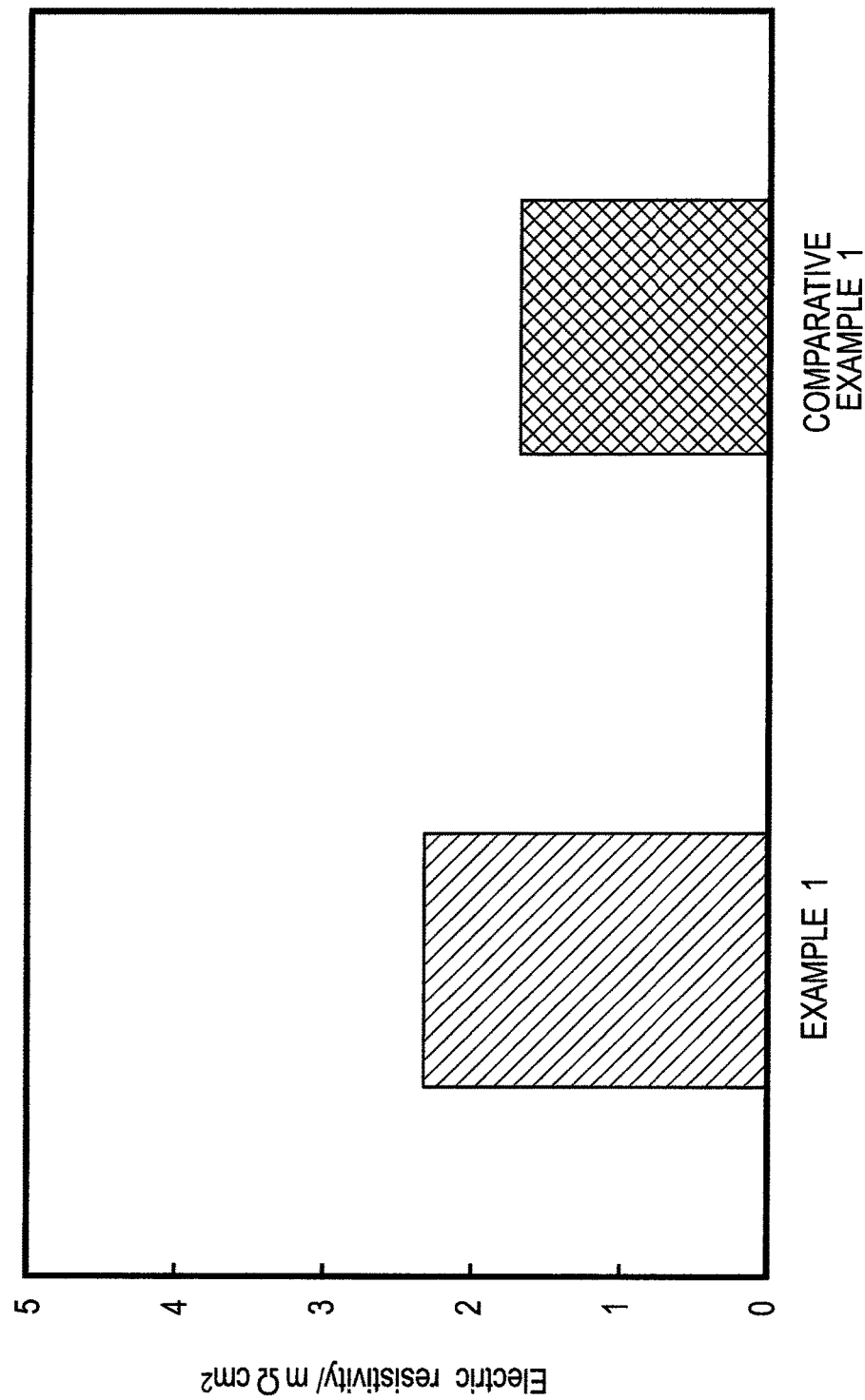
FIG. 12 is a graph showing electrical resistances in the thickness direction of the microporous layers of Example 1 and Comparative example 1 while comparing the electrical resistances with each other.

Measurement results of the electrical resistances of the MPLs in the thickness direction, which are obtained by Example 1 and Comparative example 1, are shown in FIG. 12. Note that these results show electrical resistances of only the MPLs. Although the electrical resistance in Comparative example 1 in which the MPL has the single layer structure is a little smaller, the electrical resistance in Example 1 in which the MPL has the two-layer structure is also sufficiently small, and it can be said that the electrical resistance in Example 1 compares favorably with that in Comparative example 1. Note that, in the event of the measurement, both surfaces of such an MPL with an area of 0.95 cm$^2$ are sandwiched by metal foil, and the MPL is energized in a state where a load is applied thereto, and the measurement is thereby performed. A current value was set at 1 A, and a first cycle was taken at a pressure of 5 MPa, and a value at a pressure of 1 MPa in a second cycle was obtained. Such values thus obtained in Example 1 and Comparative example 1 were compared with each other.

Figure 13:
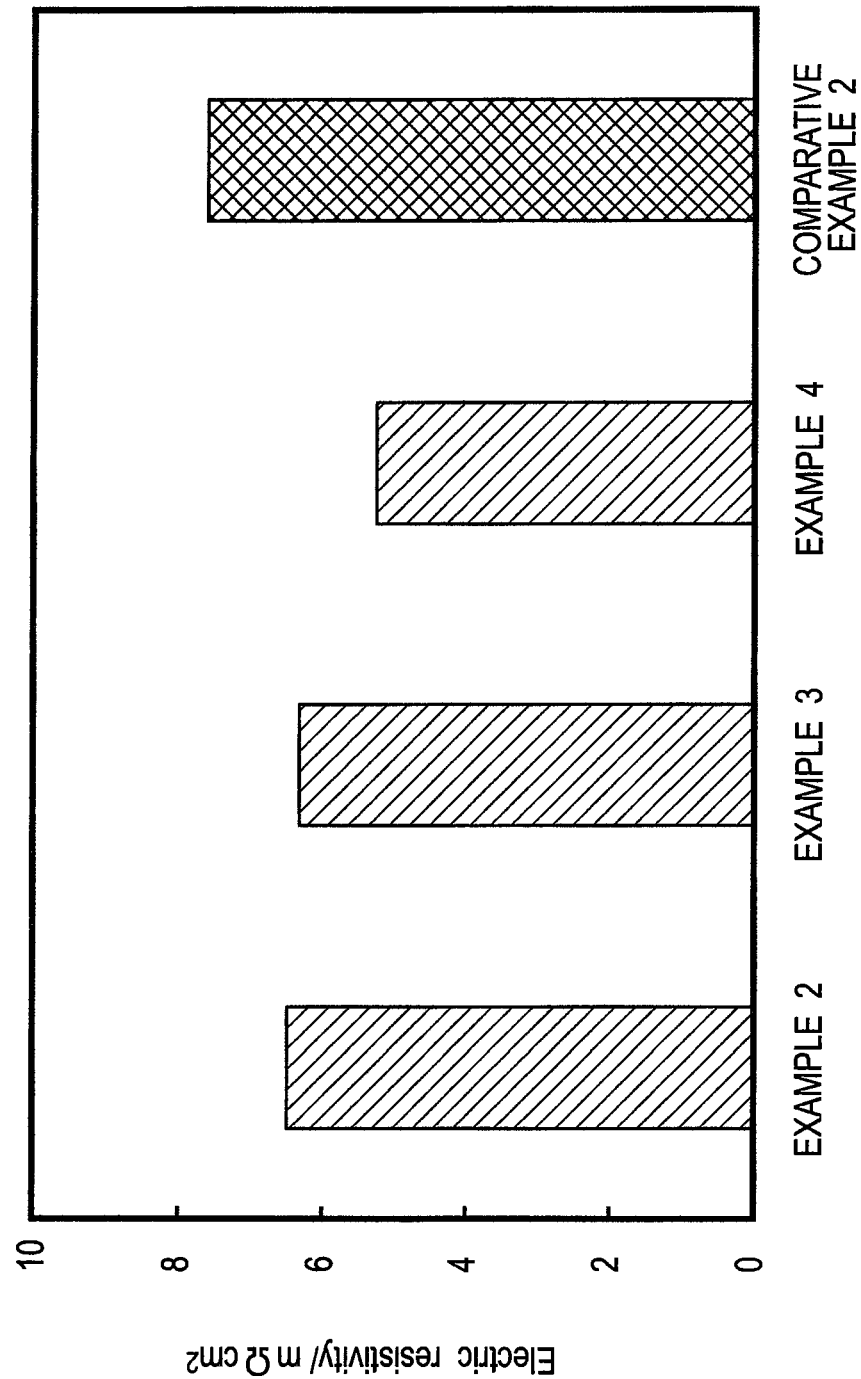
FIG. 13 is a graph showing electrical resistances in the thickness direction of the microporous layers of Examples 2 to 4 and Comparative example 2 while comparing the electrical resistances with one another.

Moreover, measurement results of the electrical resistances in the thickness direction in the MPLs obtained by Examples 2 to 4 and Comparative example 2 are shown in FIG. 13. However, each of these results shows the electrical resistance as a whole of the MPL and the carbon paper. It was confirmed that, in comparison with Comparative example 2 in which the MPL has the single layer structure, the electrical resistances of Examples 2 to 4, in each of which the MPL has the two-layer structure, are substantially equivalent thereto.

[Evaluation Result 1 of Cell Power Generation]

MEAs were fabricated by using the GDLs fabricated by the MPL sheets of Example 1 and Comparative example 1. That is to say, assemblies, each of which is in a state where the catalyst layers are coated on both surfaces of the electrolyte membrane, are individually sandwiched by the foregoing GDLs, whereby each of the MEAs was obtained. Note that the electrolyte membrane is composed of the perfluorosulfonic acid-based electrolyte, and the catalyst layer is composed of the platinum-carried carbon and the perfluorosulfonic acid-based electrolyte similar to that of the foregoing electrolyte membrane. An active area of each of the MEAs was set at 5×2 cm$^2$.

Figure 14:
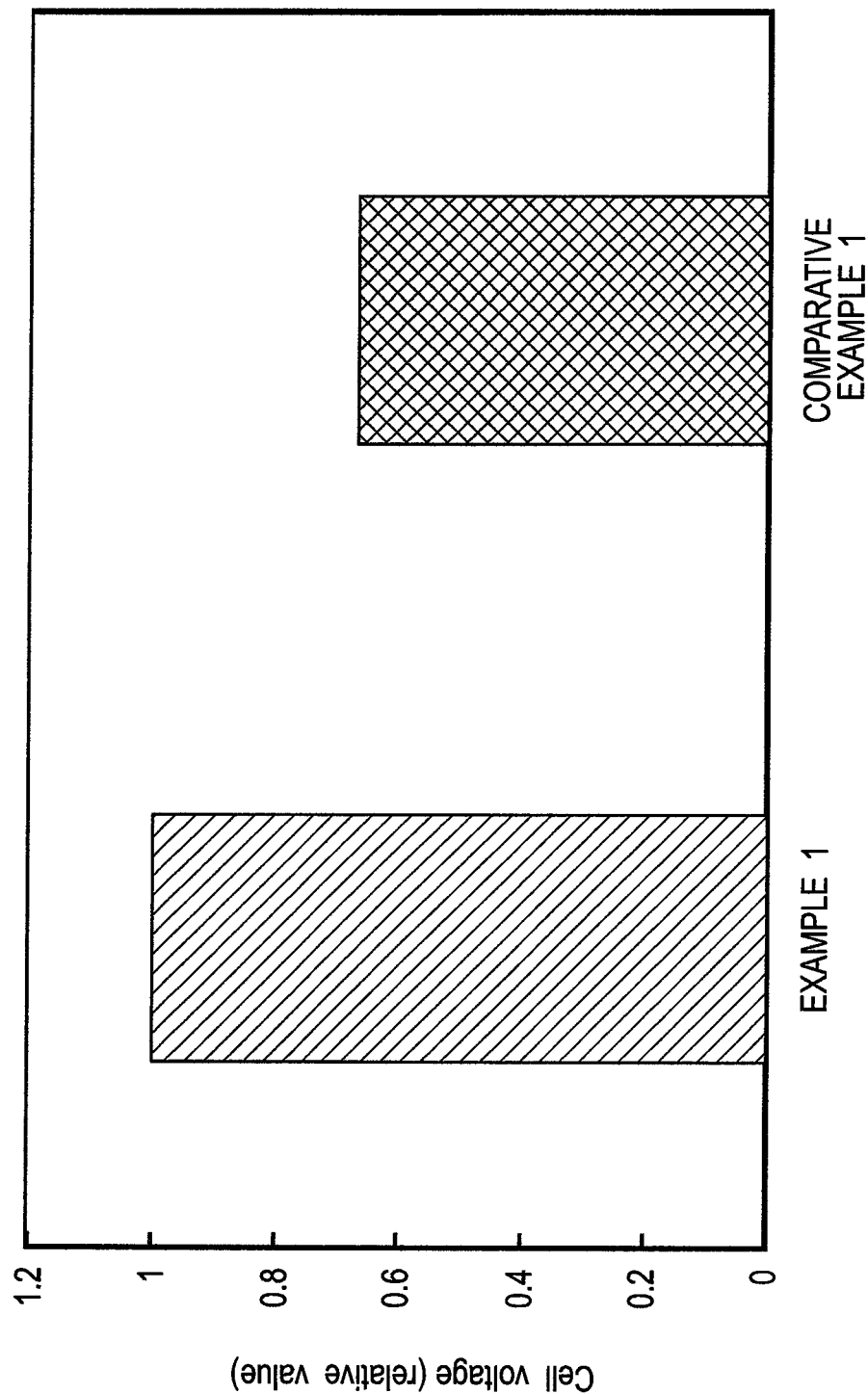
FIG. 14 is a graph showing power generation performances of cells including the microporous layers of Example 1 and Comparative example 1 while comparing the power generation performances with each other.

Next, by using a small-sized single cell composed of the MEAs obtained in the manner described above, evaluation of the power generation was performed under conditions of H$_2$/Air, 80° C. and 200 kPa_a. Then, results of the evaluation of the power generation at 1.2 A/cm$^2$ in the case where a relative humidity is 90% RH in both of the anode and the cathode as an example of the damp and wet conditions are shown in FIG. 14. It was recognized that, in comparison with the MEA according to Comparative example 1 in which each of the MPLs has the single layer structure, the MEA according to Example 1 in which each of the MPLs has the two-layer structure exhibits higher performance under the damp and wet conditions.

[Evaluation Result 2 of Cell Power Generation]

Figure 15:
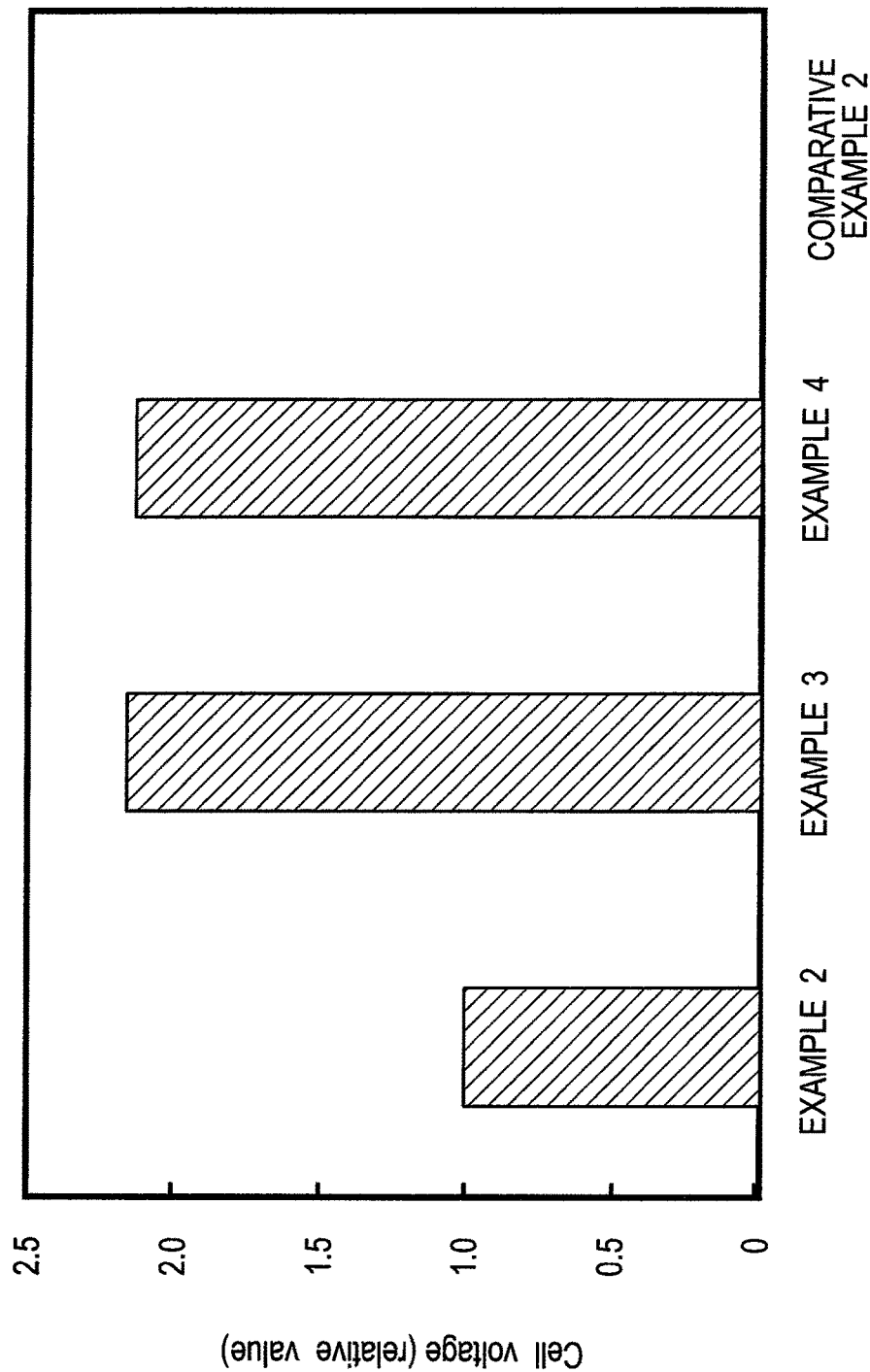
FIG. 15 is a graph showing power generation performances of cells including the microporous layers of Examples 2 to 4 and Comparative example 2 while comparing the power generation performances with one another.

In a similar way to the above, MEAs were fabricated by using the GDLs fabricated by the MPL sheets of Examples 2 to 4 and Comparative example 2. Then, power generation at 2 A/cm$^2$ under similar damp and wet conditions was evaluated. Results of the evaluation are shown in FIG. 15. It was confirmed that, in comparison with the MEA according to Comparative example 2 in which each of the MPLs has the single layer structure, the MEAs according to Examples 2 to 4, in which each of the MPLs has the two-layer structure, exhibit higher performance under the damp and wet conditions.

[Content of Binder]

Examples 5 to 7 to be shown below were newly added to Examples 1 and 4. Further, contents of fluorine derived from the component (PTFE) on upper layers and lower layers of MPLs obtained according to these Examples 1 and 4 to 7 were measured by a SEMEDX, and were compared and investigated with the case of Comparative example 2 in which the MPL has the single layer structure. Note that the lower layer of the MPL is located on the gas diffusion layer substrate side, and refers to the first layer in the embodiment. Moreover, the upper layer of the MPL is joined to the first layer on an opposite side with a joint surface of the foregoing first layer and the gas diffusion layer substrate, and refers to the second layer in the embodiment.

Embodiment 5

As the MPL ink for the first layer, there was used ink containing the foregoing scale-like graphite and the acetylene black in a ratio of 87.5% and 12.5%, respectively. Except for the above, similar operations to those of Example 1 were repeated, whereby an MPL sheet of Example 5 was obtained.

Example 6

As the MPL ink for the first layer, there was used ink containing the foregoing scale-like graphite, the acetylene black and the PTFE in a ratio of 86.6%, 12.4% and 1%, respectively. Except for the above, similar operations to those of Example 1 were repeated, whereby an MPL sheet of Example 6 was obtained.

Example 7

As the MPL ink for the first layer, there was used ink containing the foregoing scale-like graphite, the acetylene black and the PTFE in a ratio of 84.9%, 12.1% and 3%, respectively. Except for the above, similar operations to those of Example 1 were repeated, whereby an MPL sheet of Example 7 was obtained.

Results of comparing the contents of the binder in the upper surfaces and lower surfaces of the microporous layers with one another with regard to Examples 1 and 4 to 7 and Comparative example 2 are shown in FIG. 16. It is understood that, in the MPL of Comparative example 2, which has the single layer structure, a concentration of the fluorine on the gas diffusion layer substrate side is higher than a concentration of the fluorine on the opposite side with the gas diffusion layer substrate, and that the content of the binder on the gas diffusion layer substrate side is large. As oppose to this, in each of the MPLs according to Example 1 and Examples 4 to 7, in which the MPLs have the two-layer structure, it was confirmed that a concentration of the fluorine on the lowermost layer on the gas diffusion layer substrate side, that is, the content of the binder, is lower than in the layers other than the foregoing lowermost layer.

The entire contents of Japanese Patent Application No. 2011-135078 (filed on: Jun. 17, 2011) and Japanese Patent Application No. 2012-095527 (filed on: Apr. 19, 2012) are incorporated herein by reference.

The description has been made above of the contents of the present invention along the embodiment; however, it is self-obvious for those skilled in the art that the present invention is not limited to the description of these, and that varieties of modifications and improvements are possible.

INDUSTRIAL APPLICABILITY

In accordance with the present invention, the MPL sheet, which has the multilayer structure including at least two microporous layers, is configured. Moreover, the MPL sheet as described above is configured so that the content of the binder in the first layer located on the gas diffusion layer substrate side is smaller than the contents of the binder in the other layers. In such a way, even if the dropping of the binder by the self-weight thereof occurs, the maldistribution of the binder in the lowermost layer is reduced, and the gas permeability and the drainage properties can be ensured.

REFERENCE SIGNS LIST

1 MEMBRANE ELECTRODE ASSEMBLY (MEA)
10 ELECTROLYTE MEMBRANE
20 CATALYST LAYER
30 GAS DIFFUSION LAYER (GDL)
31 GAS DIFFUSION LAYER SUBSTRATE (GDL SUBSTRATE)
40 MICROPOROUS LAYER SHEET (MPL SHEET)
41 FIRST MPL (MICROPOROUS LAYER AS FIRST LAYER)
42 SECOND MPL
Gf SCALE-LIKE GRAPHITE (LARGE-DIAMETER SCALE-LIKE GRAPHITE)
Gfs SMALL-DIAMETER SCALE-LIKE GRAPHITE
Gg GRANULAR GRAPHITE
C CARBON BLACK
S HOLDING SHEET

The invention claimed is:

1. A microporous layer sheet for a fuel cell, comprising:
at least two microporous layers containing a carbon material and a binder, the microporous layers being stacked on a gas diffusion layer substrate,
wherein a content of the binder in the microporous layer as a first layer located on the gas diffusion layer substrate side is less than contents of the binder in the microporous layers other than the first layer, wherein the carbon material contains large-diameter scale-like graphite having a mean planar diameter of 5 μm to 50 μm and small-diameter scale-like graphite having a mean planar diameter smaller than 5 μm, wherein a thickness of the large-diameter scale-like graphite is in a range from 0.05 μm to 1 μm, and an aspect ratio which is represented by (the mean planar diameter of the large-diameter scale-like graphite/a thickness of the large-diameter scale-like graphite) is in a range from 10 to 1000, and wherein a thickness of the small-diameter scale-like graphite is in a range from 0.05 μm to 1 μm, and an aspect ratio which is represented by (the mean planar diameter of the small-diameter scale-like graphite/a thickness of the small-diameter scale-like graphite) is in a range from 10 to 1000, wherein the scale-like graphite is oriented in a state extending along a plane direction of respective layers of the scale-like graphite.

2. The microporous layer sheet for a fuel cell according to claim 1, wherein the carbon material further contains at least one of carbon black or granular graphite.

3. A gas diffusion layer for a fuel cell, wherein the gas diffusion layer is configured by pasting, onto a gas diffusion layer substrate, a first layer side in the microporous layer sheet for a fuel cell according to claim 1.

4. A membrane electrode assembly for a fuel cell, wherein the membrane electrode assembly is configured by stacking the gas diffusion layers for a fuel cell according to claim 3 on both surfaces of an electrolyte membrane while interposing catalyst layers between the gas diffusion layers and both surfaces of the electrolyte membrane.

5. The microporous layer sheet for a fuel cell according to claim 1, wherein the mean planar diameter of the large-diameter scale-like graphite and the mean planar diameter of the small-diameter scale-like graphite are a mean diameter of the large-diameter scale-like graphite and the small-diameter scale-like graphite in a flat plane direction, respectively.

* * * * *